(12) United States Patent
Lester

(10) Patent No.: US 8,663,048 B2
(45) Date of Patent: Mar. 4, 2014

(54) TRANSLATING GEAR SET WITH LINKAGES

(76) Inventor: William Terry Lester, Fort Worth, TX (US)

(*) Notice: Subject to any disclaimer, the term of this patent is extended or adjusted under 35 U.S.C. 154(b) by 114 days.

(21) Appl. No.: 13/084,554

(22) Filed: Apr. 12, 2011

(65) Prior Publication Data

US 2012/0264556 A1    Oct. 18, 2012

(51) Int. Cl.
*F16H 1/32* (2006.01)
(52) U.S. Cl.
USPC .............................. 475/162; 475/343; 74/640
(58) Field of Classification Search
USPC .............................. 475/162, 163, 343; 74/640
See application file for complete search history.

(56) References Cited

U.S. PATENT DOCUMENTS

| | | | | |
|---|---|---|---|---|
| 1,568,290 A | * | 1/1926 | Morison | 74/52 |
| 2,127,331 A | * | 8/1938 | Otho Fulton | 346/35 |
| 4,021,160 A | * | 5/1977 | Todorovic | 418/61.1 |
| 4,756,203 A | * | 7/1988 | Matsuda | 74/84 R |
| 5,352,162 A | * | 10/1994 | Coronel | 475/169 |
| 7,178,427 B2 | * | 2/2007 | Christensen | 74/640 |
| 8,425,364 B2 | * | 4/2013 | Lahr | 475/207 |
| 2008/0076617 A1 | * | 3/2008 | Lee | 475/162 |

* cited by examiner

*Primary Examiner* — Justin Holmes

(57) ABSTRACT

A transmission utilizing a translating gear and links to provide a high speed ratio in a small, efficient package. A gear set has an input and an output, with a speed ratio between the input and the output. The gear set has one gear that rotates and that provides a circular path for another gear. The rotational gear is attached to the input or the output. The other gear is engaged with the rotational gear and translations on a circular path. The second gear is connected with linkages to the other of the input or the output which resembles a crankshaft.

4 Claims, 28 Drawing Sheets

TRANSLATING GEAR SET WITH LINKAGES

FIELD OF THE INVENTION

The present invention relates to planetary gear sets of the type that are use to transfer torque from one rotating shaft to another where the two shafts are rotating at different speeds.

BACKGROUND OF THE INVENTION

Transmissions or gear-boxes are used in a variety of applications to change the speed and torque provided by a prime mover such as an automotive engine, wind power system, or wind turbine. Two or more gears are used in transmission of rotational motion, torque and power from on rotating shaft to another.

A familiar use of gears is in power transmission of an automobile. The engine, rotation at high speed, delivers power to the transmission, which gears reduce the speed at which the power is transmitted to the drive shaft. Thus the wheels rotate at a speed much lower than that at which the engine turns.

One type of arrangement of gears in many types of transmissions and gearboxes are planetary gear sets. Planetary gear sets are compact and optimized combination of gears to transfer torque from one rotating shaft to another.

A prior art planetary gear set has four parts which are the sun gear, the ring gear, and planet gears and the planet carrier. In one configuration, the sun gear rotates, causing the planet gears to rotate about the sun gear. The planet gears are inside of the ring gear, which rotates at a reduced speed.

Conventional planetary gear sets are limited in speed ratios to no more than 9:1. Higher speed ratios require a stack of planetary gear sets, also known as multiple stage gear sets. The use of a stack reduces the compactness of the gear set and increases the complexity of the device as well as decreases efficiency.

It is desirable to have planetary gear set with high speed ratios for a variety of applications.

SUMMARY OF PRESENT INVENTION

The present invention provides a gear set that comprises an input and an output, with a speed ratio between the input and the output. A first gear rotates and provides a circular path for another gear that is engaged with the first gear. The first gear is connected to one of the input or the output. A second gear is engaged with the first gear and translates in the path relative to the first gear. The second gear is connected with linkages to the other of the input or the output which resembles a crankshaft.

In accordance with one aspect of the present invention, the first gear comprises a spur gear and the second gear comprises a ring gear.

In accordance with still another aspect of the present invention, plural second gears are engaged with the first gear and are interconnected with each other by linkages to the crankshaft.

BRIEF DESCRIPTION OF THE DRAWINGS

FIGS. 12A-20A are end views of the same.

DESCRIPTION OF THE PREFERRED EMBODIMENT

Figure 1:
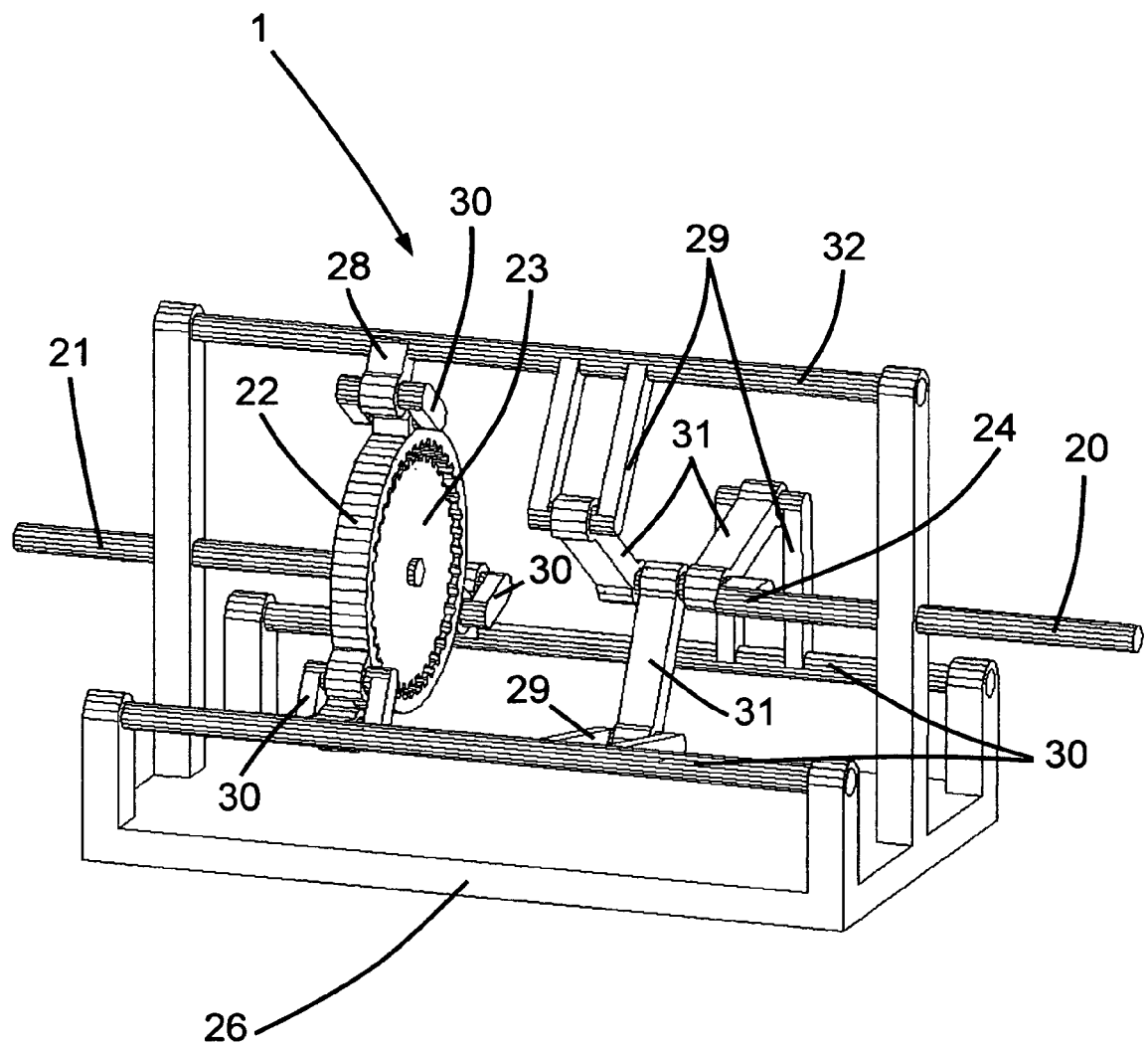
FIG. 1 is a perspective view of a gear set of the present invention, in accordance with a preferred embodiment.

The present invention provides a gear set that can be used in a number of applications. FIG. 1 shows the gear set 1 in accordance with a preferred embodiment. The gear set has a translational or ring gear 22 and a spur gear 23. The spur gear 23 rotates. The translational gear 22 moves outside of the spur gear 23, but the motion is not rotational. Instead, the translational gear 22 translates in a circular path relative to the spur gear 23. The circular translational motion enables the gear set to provides higher speed ratios than conventional gear sets.

The gear set 1 has a low torque shaft 20 and a high torque shaft 21.

Figure 2:
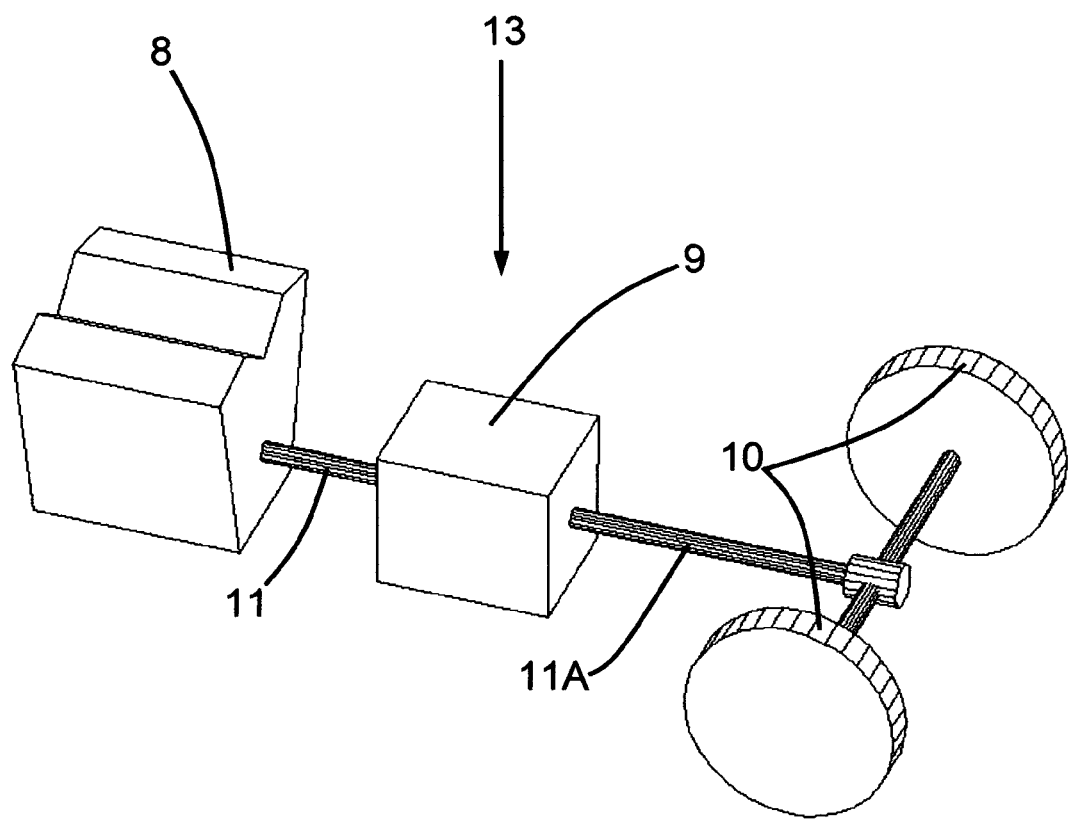
FIG. 2 is a schematic view of a vehicle drive train, incorporating the gear set of the present invention.

The gear set can be used in a number of applications. An example of one such application is shown in FIG. 2, which shows a vehicle drive train 13. Still another example application is use in a wind power system or wind turbine. Referring to FIG. 2, the drive train 11 has a prime mover 8, such as an internal combustion engine. The internal combustion engine can be powered by gasoline, diesel, natural gas, etc. Other types of prime movers can be used, such as electric motors. The gear set is located in a transmission 9 or gear box. The transmission 9 has an input, such as shaft 11 connected to the prime mover 8 and an output, such as a shaft 11A, connected to the load 10. The load 10 in the illustration is a set of vehicle wheels. In the application shown in FIG. 2, the input shaft 11 would correspond to the low torque shaft 20 FIG. 1 and the output shaft 11A of FIG. 2 would correspond to the high torque shaft 21 of FIG. 1. The gear set 1 serves as a speed reducer when conveying power from the prime mover 8 to the wheels 10.

Figure 3:
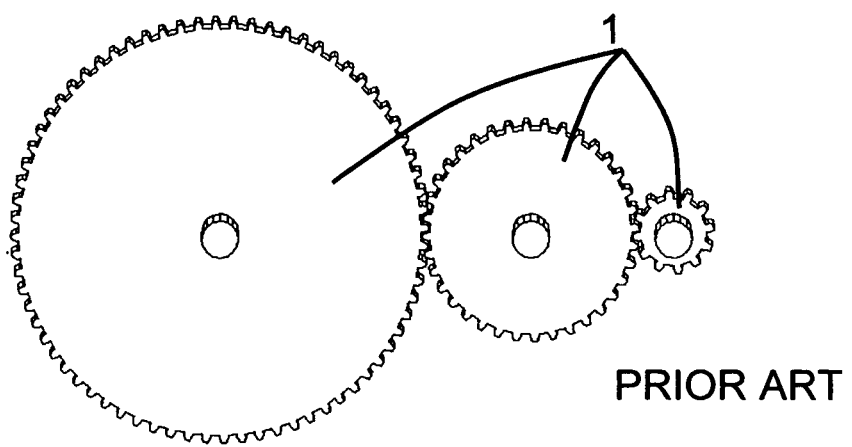
FIG. 3 is a prior art three gear train.
Figure 4:
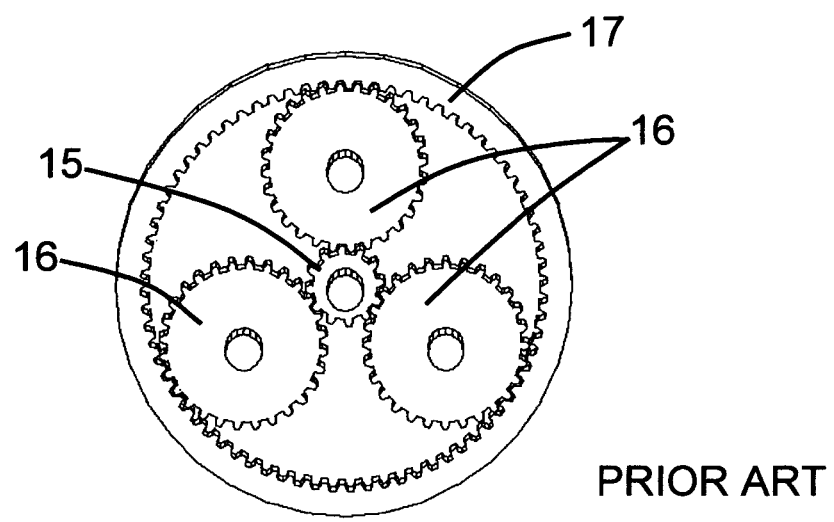
FIG. 4 is a prior art planetary gear train.

FIGS. 3 and 4 show prior art gear sets or gear trans. The gear set shown in FIG. 3 is a three-gear train, using spur gears 14. The low torque shaft is connected to the small gear (on the right side of FIG. 3), while the high torque shaft is connected to the large gear (on the left side of FIG. 3). If the input is connected to the low torque shaft, then the small gear rotates the other two gears and the output shaft. For each revolution of the small gear, the large gear only rotates a part of a revolution. Thus, speed reduction is accomplished.

FIG. 4 shows a prior art planetary gear train. There is a sun gear 15, which is connected to a low torque shaft. Several planetary gears 16 are in rotating contact with the sun gear and also in rotating contact with a ring gear 17. A high torque shaft (not shown) is connected to the ring gear. If the input is connected to the sun gear 15, then as the sun gear rotates, the planetary gears 16 revolve around the sun gear and rotate the ring gear 17. Speed reduction is accomplished because the ring gear rotates only a part of a revolution for each revolution of the sun gear.

Figure 5:
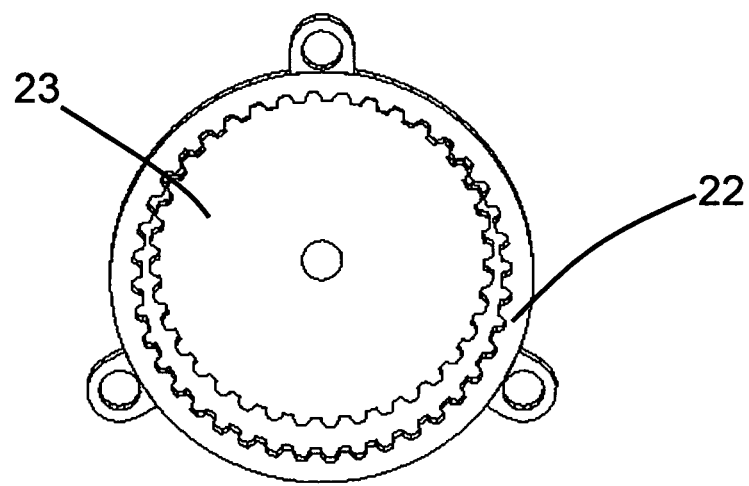
FIG. 5 is an end view of the ring gear and translating gear of FIG. 1.

FIG. 5 shows the translational and spur gears 22, 23 of the gear set 1 of the present invention. The spur gear 23 rotates like the sun gear 15 of the planetary gear set. Unlike the planetary gear set, where the ring gear 17 and the planetary gears 16 rotate, the translational gear 22 does not rotate. Instead, the translational gear 22 translates about a circular path. This will be illustrated in further detail below.

Figure 6:
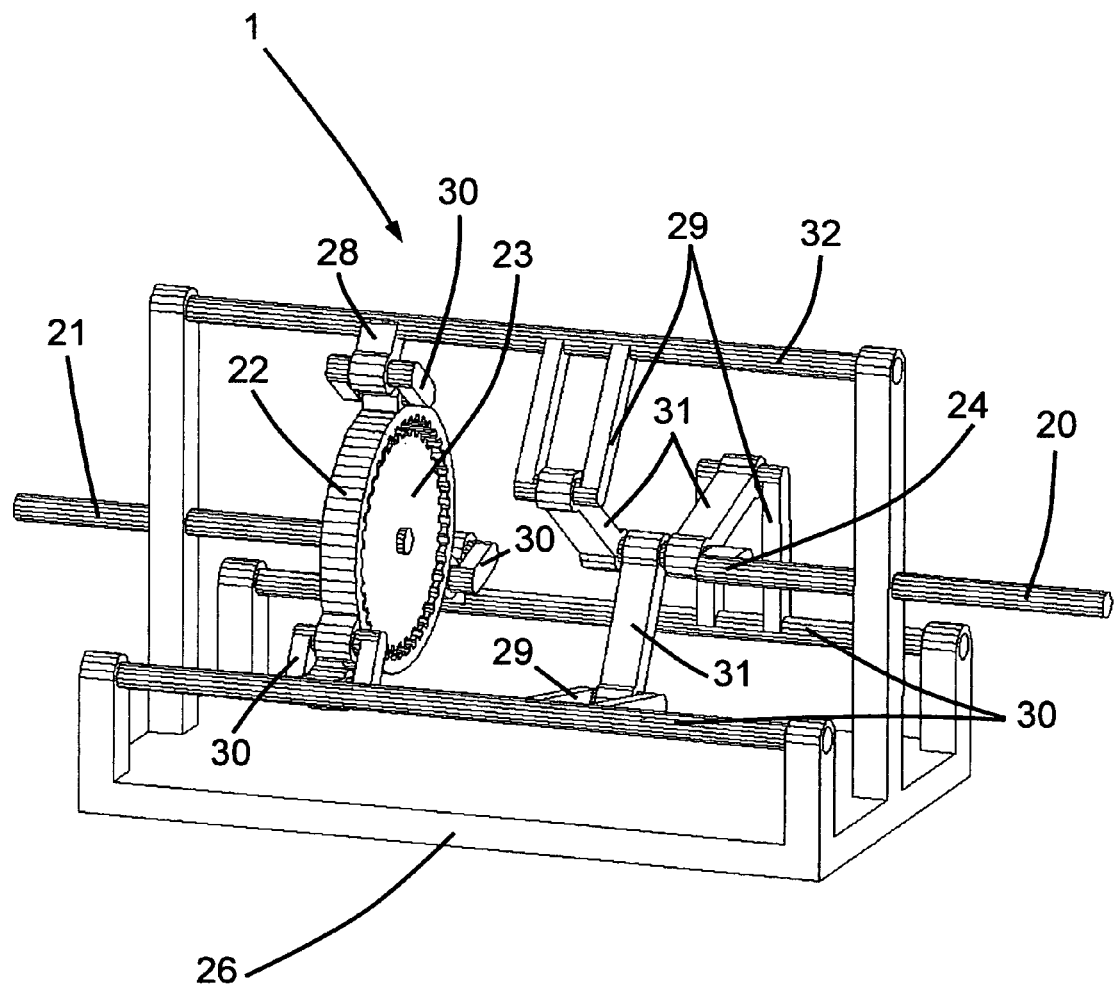
FIG. 6 is the same as FIG. 1
Figure 7:
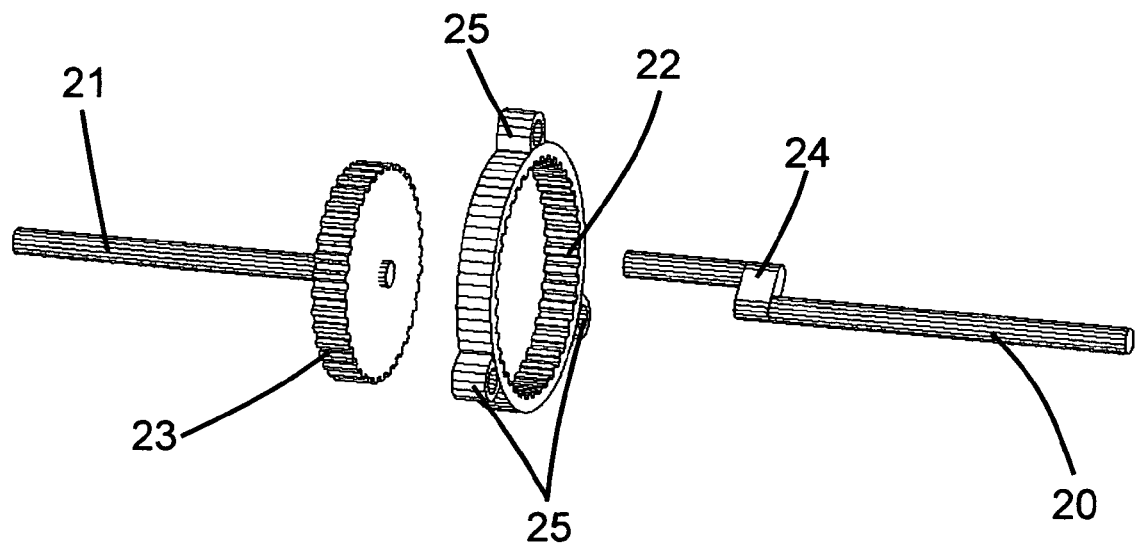
FIG. 7 is an exploded view of components of FIGS. 1 and 6.
Figure 8:
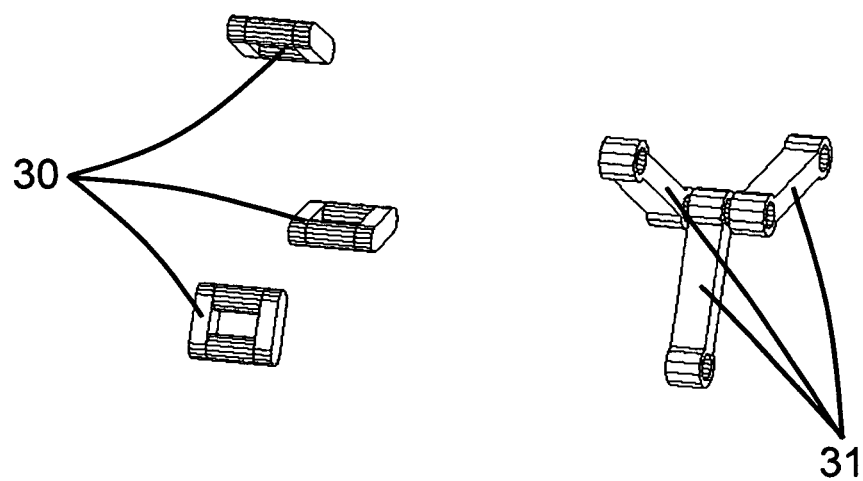
FIG. 8 is an exploded view of components of FIGS. 1 and 6.
Figure 9:
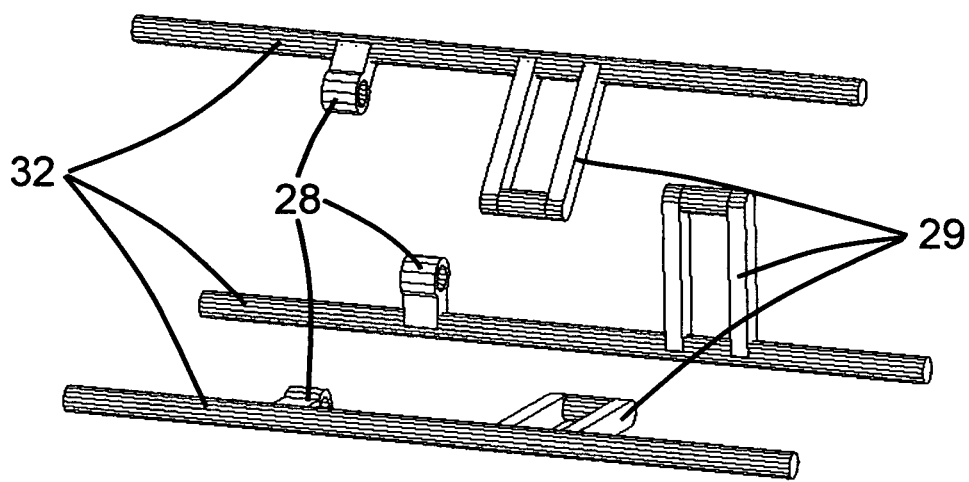
FIG. 9 is an exploded view of components of FIGS. 1 and 6.
Figure 10:
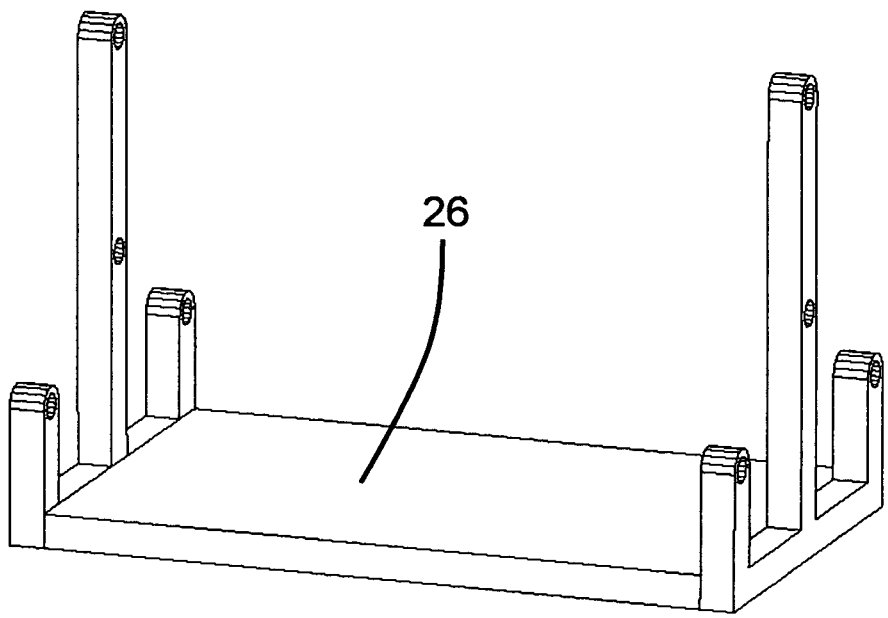
FIG. 10 is the frame component of FIGS. 1 and 6.

The gear set 1 will now be described, with reference to FIGS. 1, 6, 7, 8, 9 and 10. FIGS. 1 and 6 show the same gear set 1. The spur gear 23 is coupled to the high torque shaft 21. The translational gear 22, which is a ring gear, is located outside of the spur gear 23 so as to engage, or mesh teeth, with the spur gear. Extending from the translational gear 22 are three or more linkages which transfers the torque from the translational gear 22 to the crankshaft 24 and low torque shaft 20. The linkages are an assembly of the short links 30, short rocker-arms 28, shafts 32, long rocker-arms 29 and long links 31. The short links 30 and long links 31 are connecting structure which pivots at both ends. The short rocker-arms 28, shafts 32 and long rocker-arms 29 are connected together so that torque is transfer between the short rocker-arms 28 and the long rocker-arms 29. The long links 31 are connected to the long rocker-arms 28 and the crankshaft 24. Three or more sets of the linkages connected to the crankshaft are required to constrain the translational gear to translate about a circular path.

In operation, spur ring gear 23 rotates with the shaft 21. The spur gear can be rotated by the shaft 21, wherein the shaft 21 is an input shaft. Conversely, the spur gear can be rotated by the translational gear 22, wherein the translational gear 22, linkage assembles and the crankshaft 24 rotates the output shaft 20. Thus, the input and output are interchangeable with each other, depending upon the particular application of the gear set 1.

Figure 11:
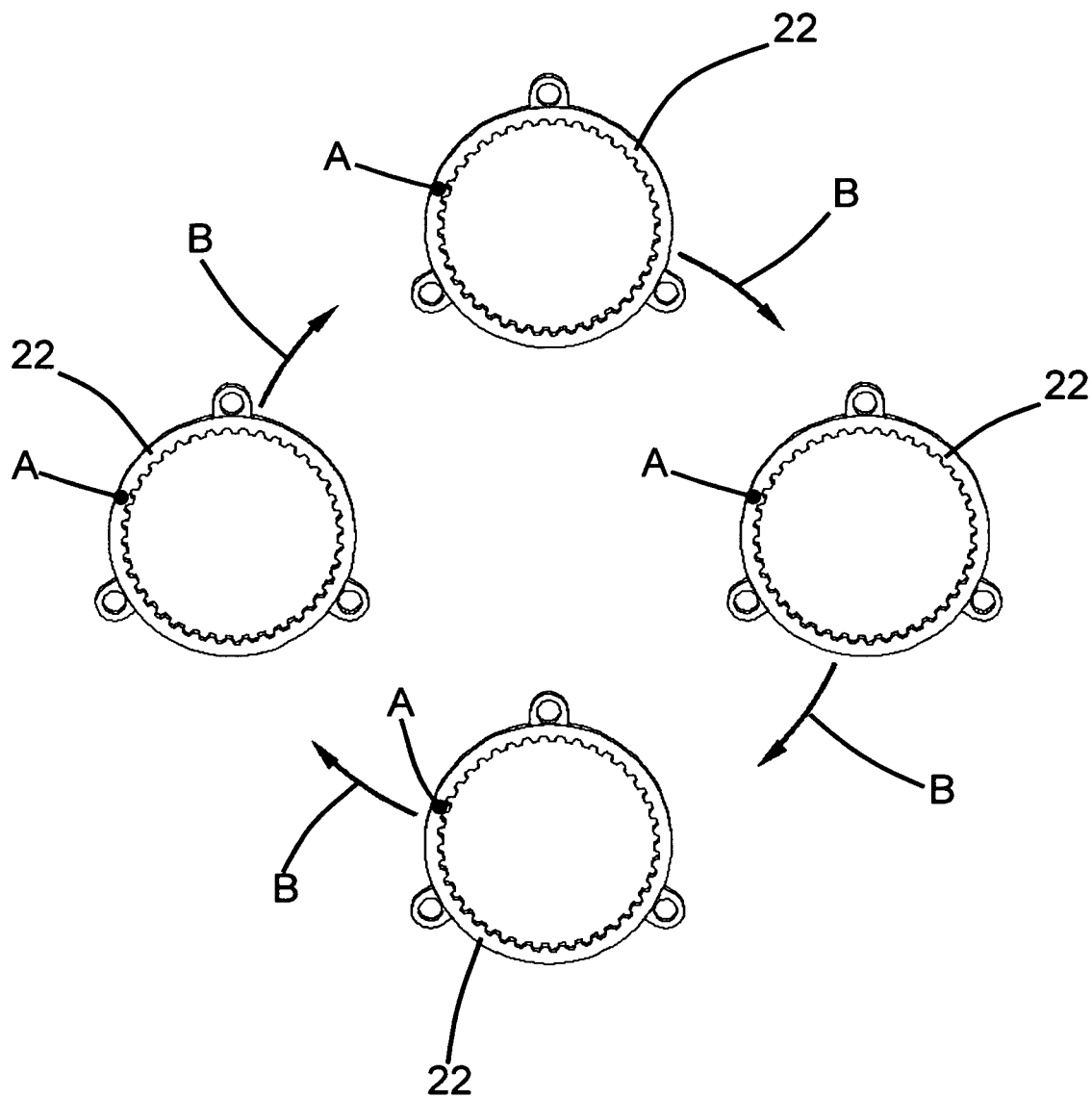
FIG. 11 is an illustration of the circular translational motion of the planetary gear, or translational gear, inside of a ring gear of the embodiment of FIGS. 1 and 6.

The spur gear 23 rotates about the longitudinal axis of the shaft 21. The spur gear 23 defines a circular path for the translational gear 22. The translational gear 22 is engaged with the spur gear 23 and translates about the circular path. The translational gear 22 is constrained to translational movement by the linkages and crankshaft 24. The linkages and crankshaft 24 prevent rotational of the translational gear 22. The linkages and crankshaft 24 are supported by the frame 26. FIG. 11 illustrates the circular path of the translational gear 22. For the discussion herein, the gear 22 has a reference point A thereon. In the topmost position of the gear (referring to the orientation of FIG. 11), point A is up. Point A remains up even as the gear moves about a circular path to a rightmost position, then to a lowermost position, then to a leftmost position and back to the topmost position. As can be seen, the gear 22 does not rotate. Instead, the gear 22 moves in translation about a circular path B. The circular path is defined by the spur gear 23. (In FIG. 11, the diameter of the circular path B is exaggerated for illustrative purposes).

Figure 12:
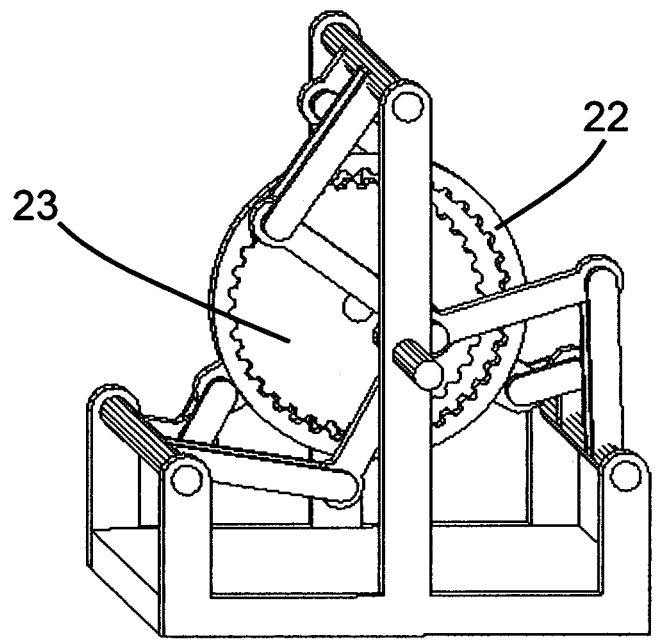
FIGS. 12-20 are perspective views of the gear set of FIGS. 1 and 6, illustrating the movement of the translational gear inside of the ring gear.
Figure 12A:
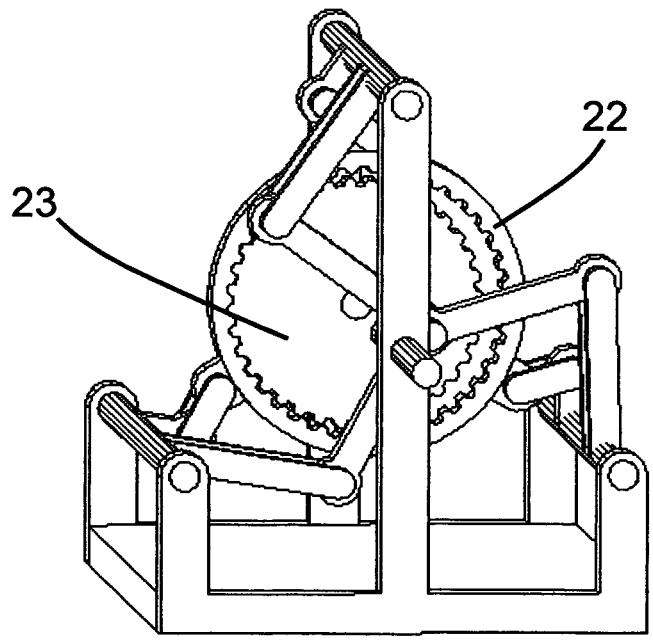
Figure 13:
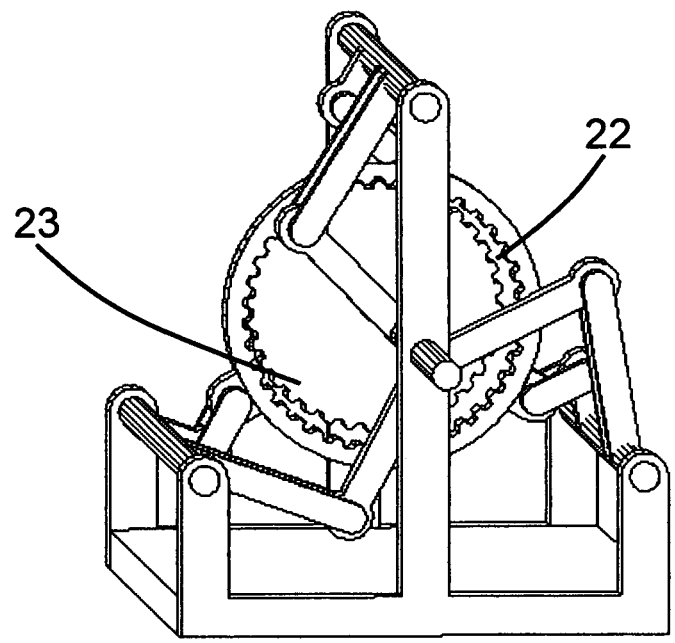
Figure 13A:
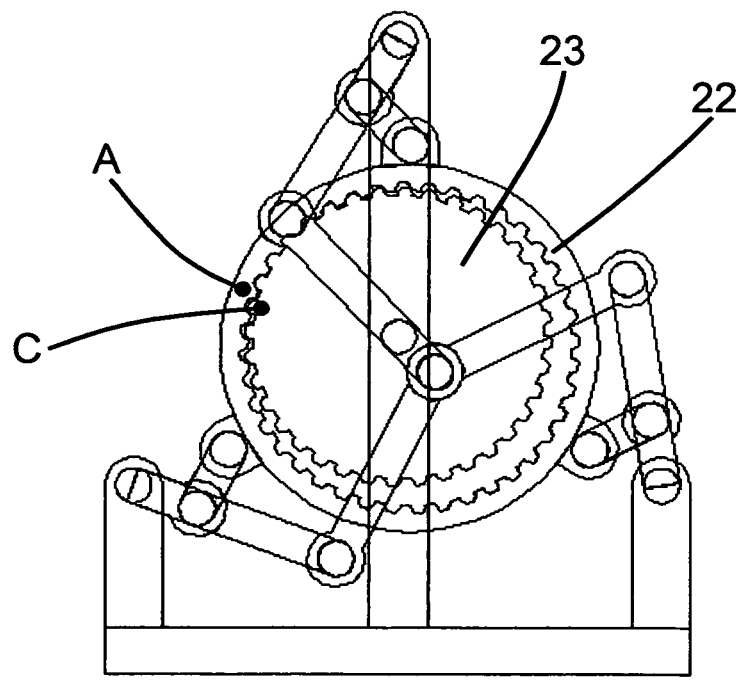
Figure 14:
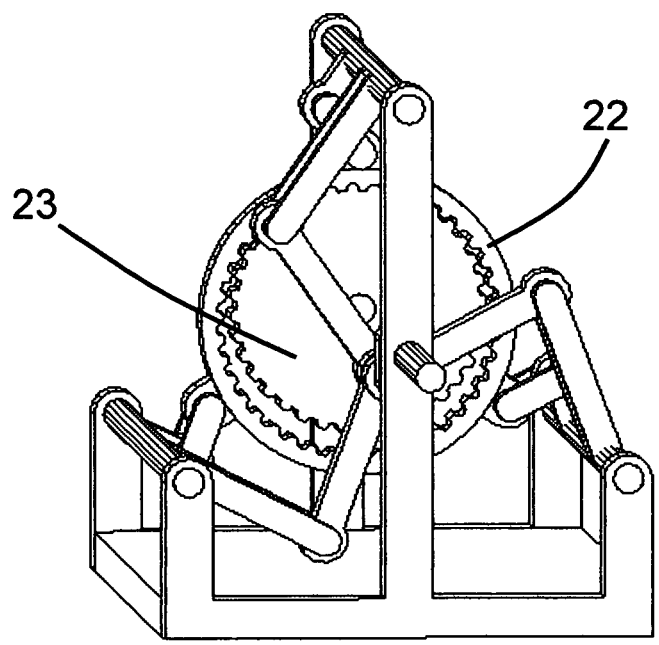
Figure 14A:
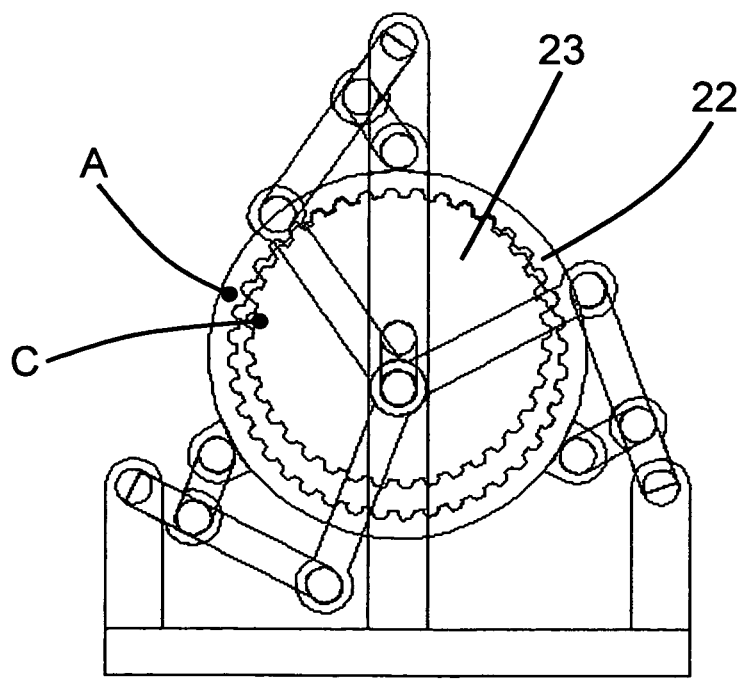
Figure 15:
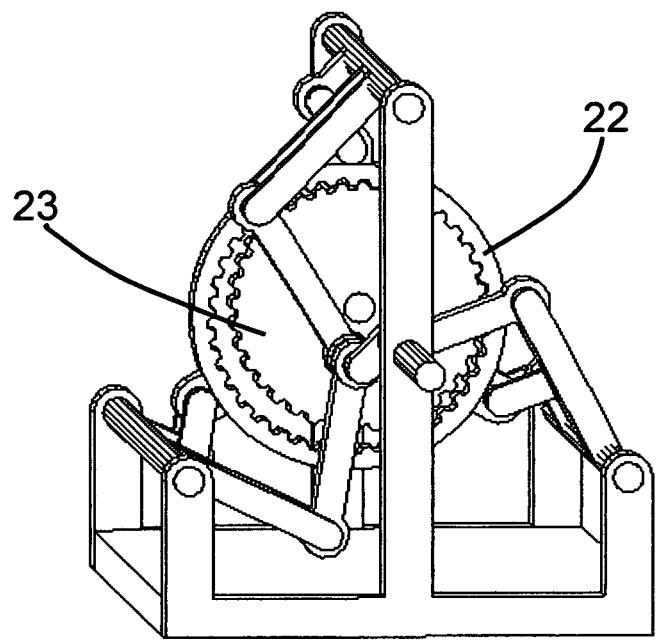
Figure 15A:
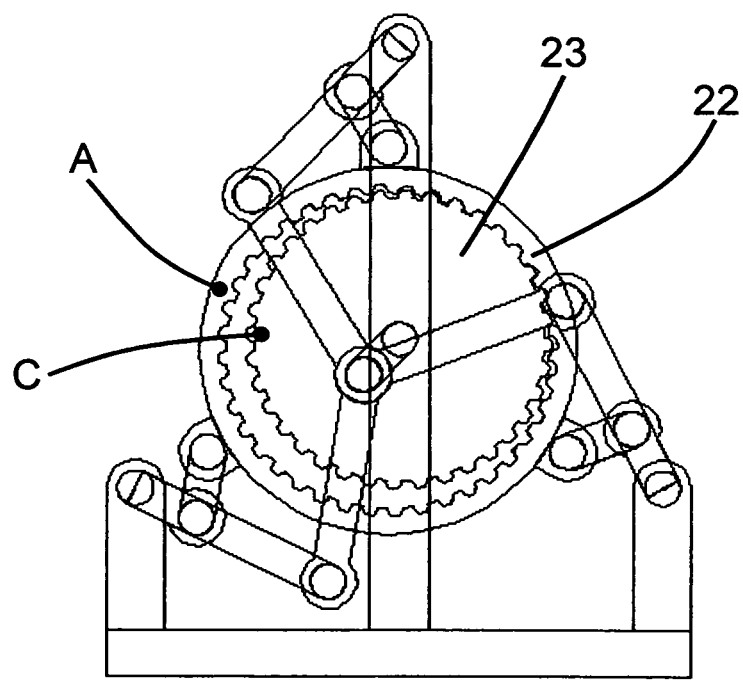
Figure 16:
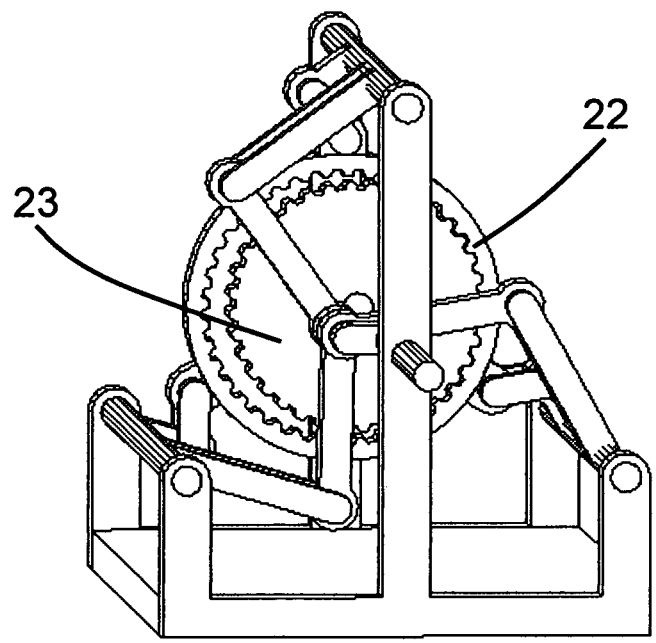
Figure 16A:
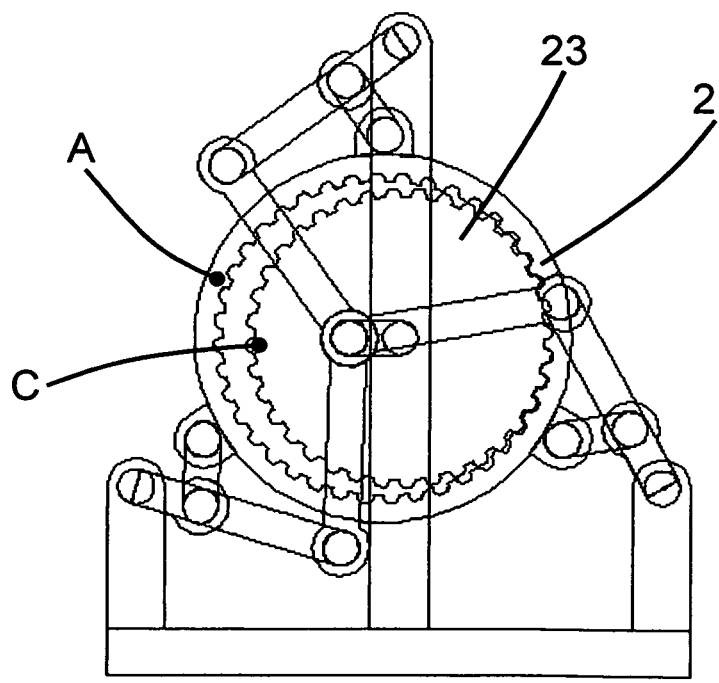
Figure 17:
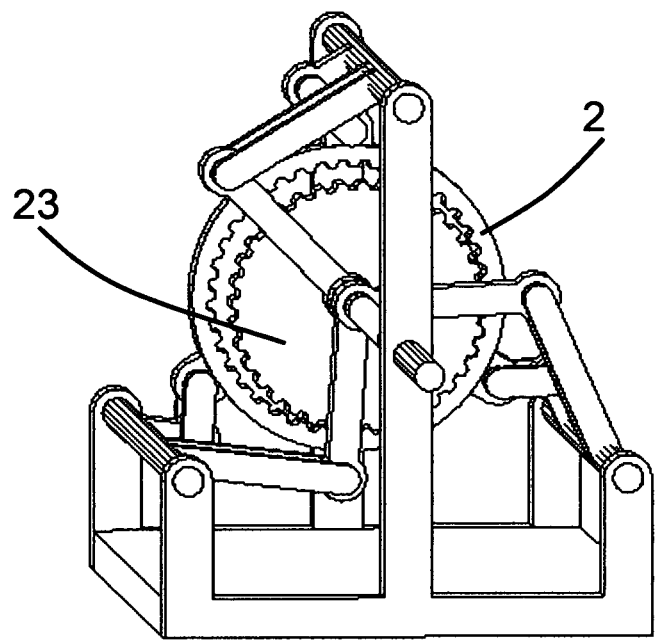
Figure 17A:
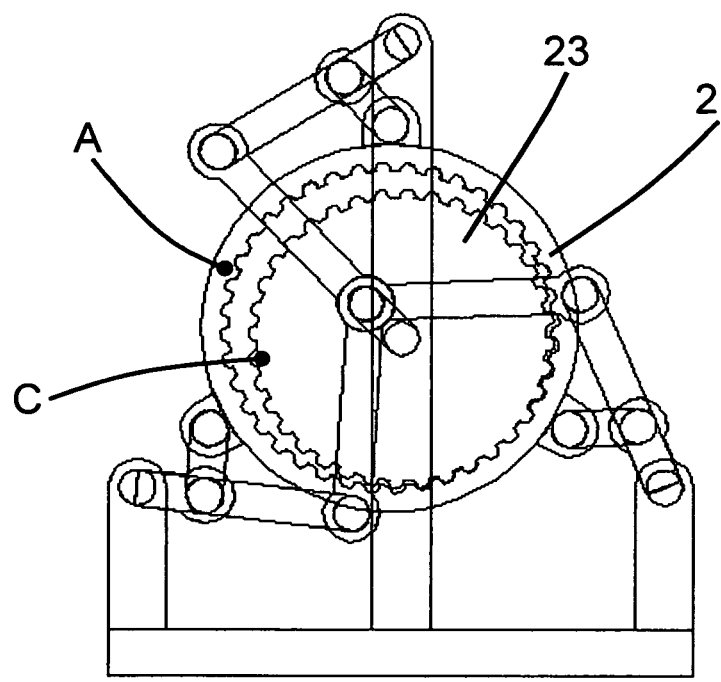
Figure 18:
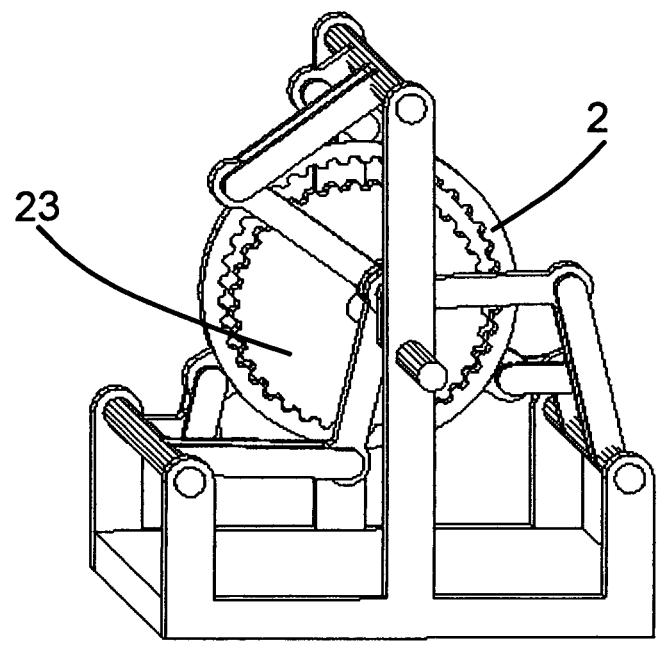
Figure 18A:
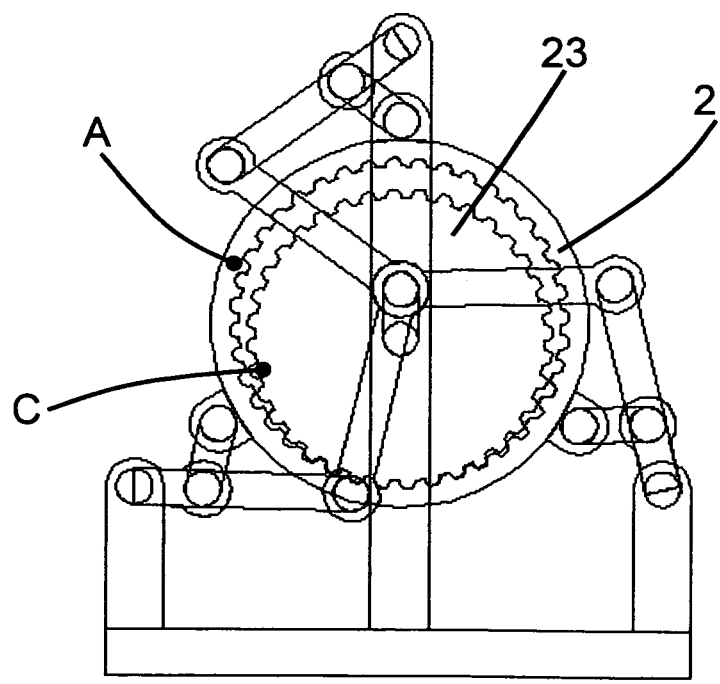
Figure 19:
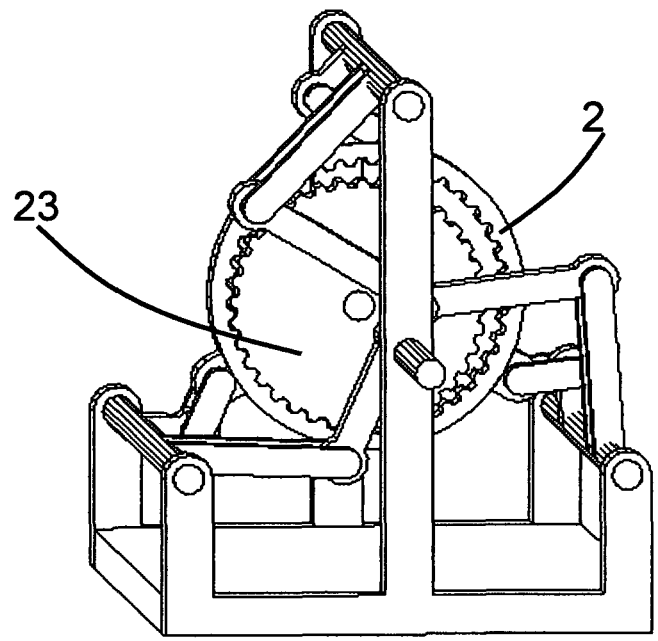
Figure 19A:
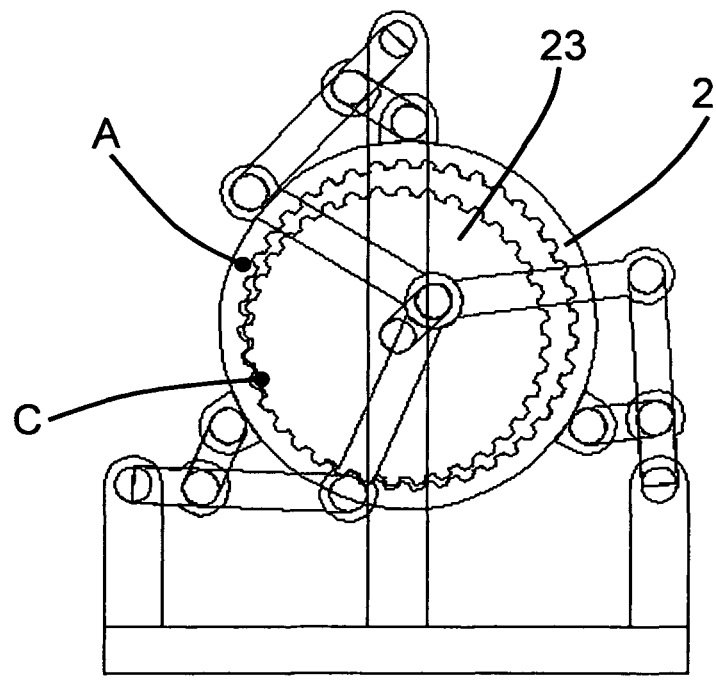
Figure 20:
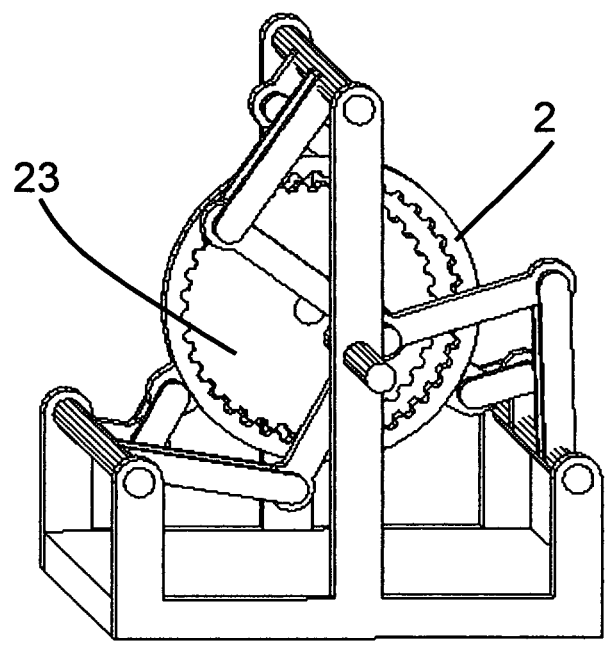
Figure 20A:
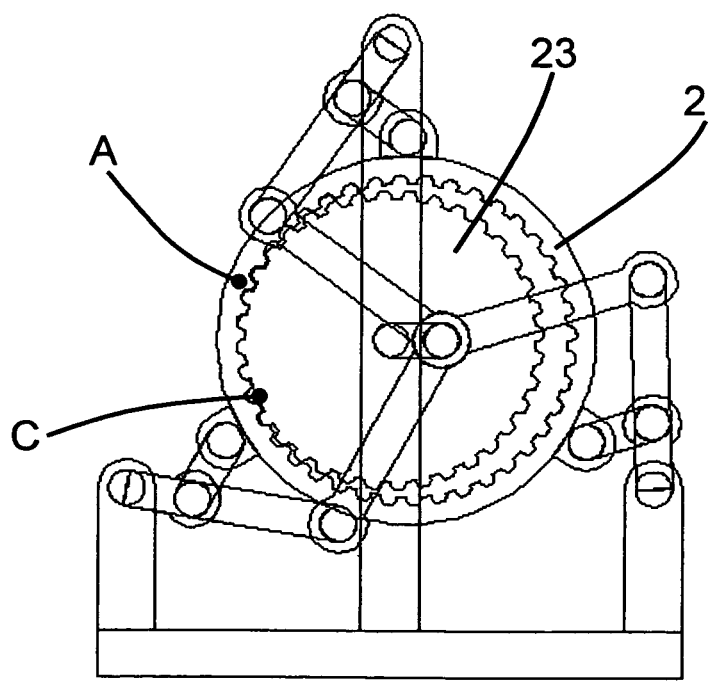
Figure 21:
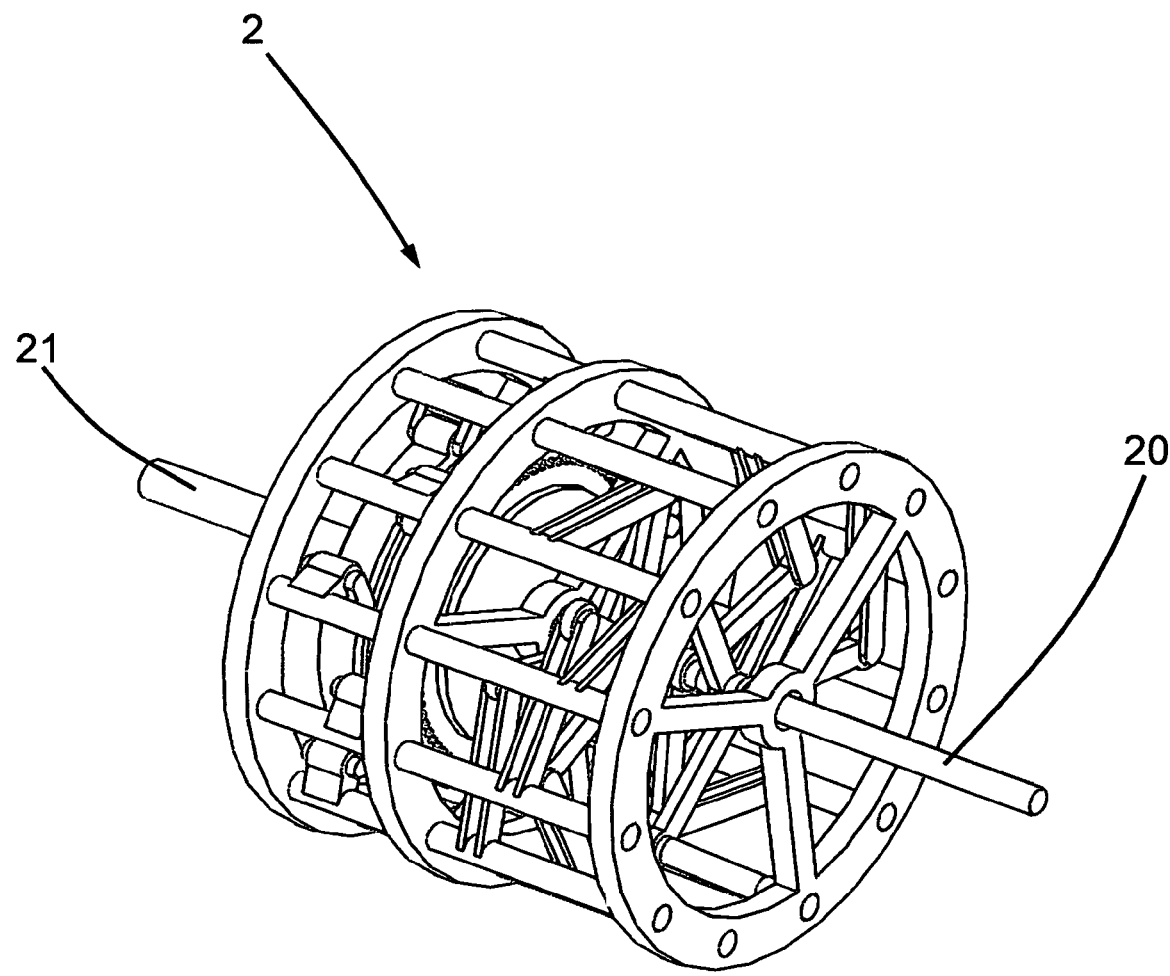
FIG. 21 a perspective view of a gear set of the present invention with multiple translational gears.
Figure 22:
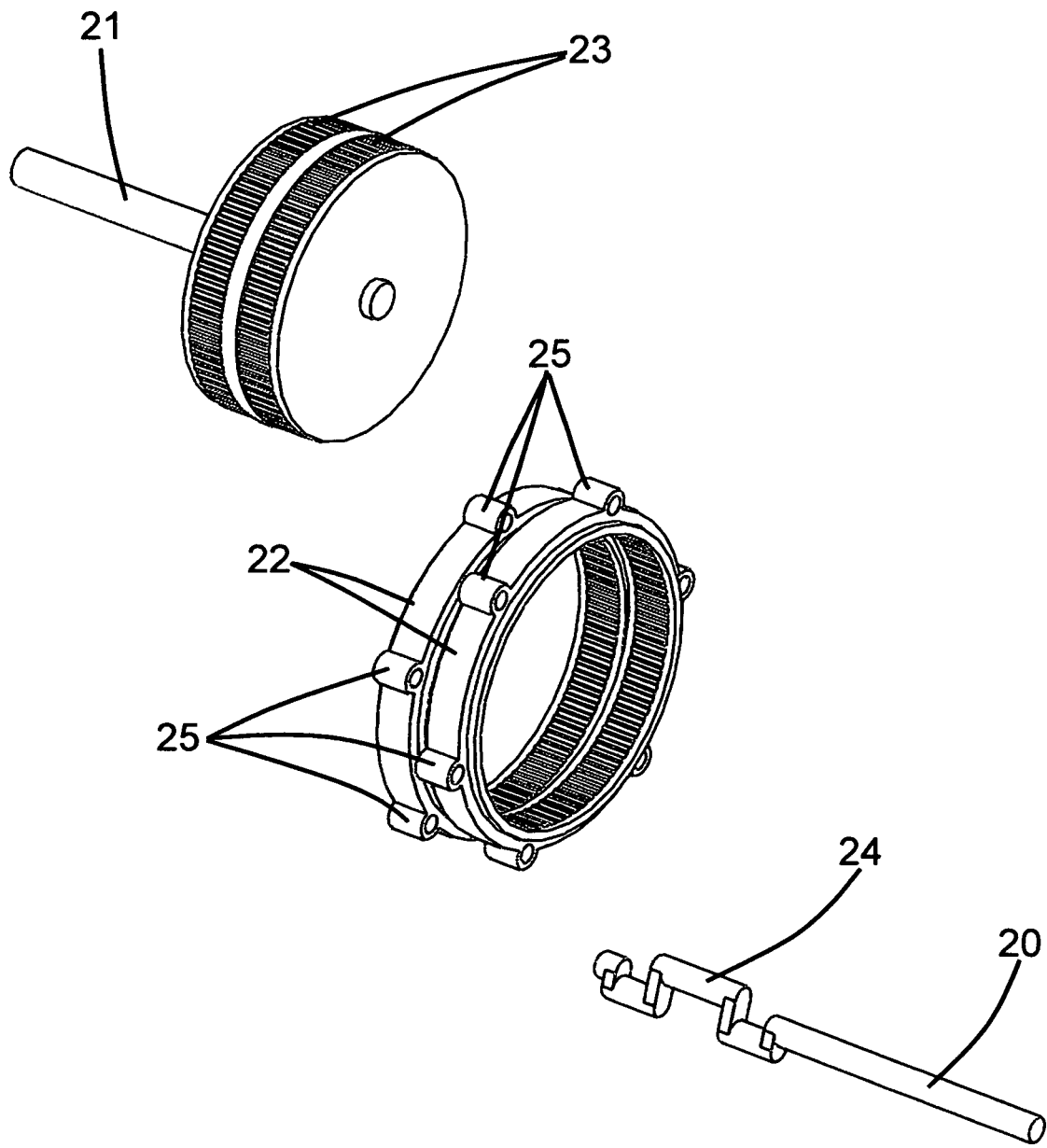
FIG. 22 is an exploded view of components of FIG. 21.
Figure 23:
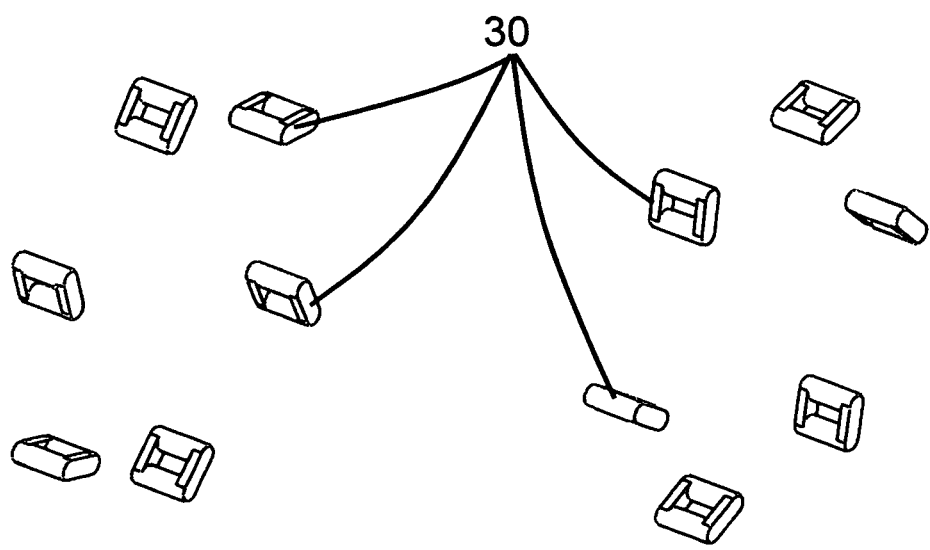
FIG. 23 is an exploded view of components of FIG. 21.
Figure 24:
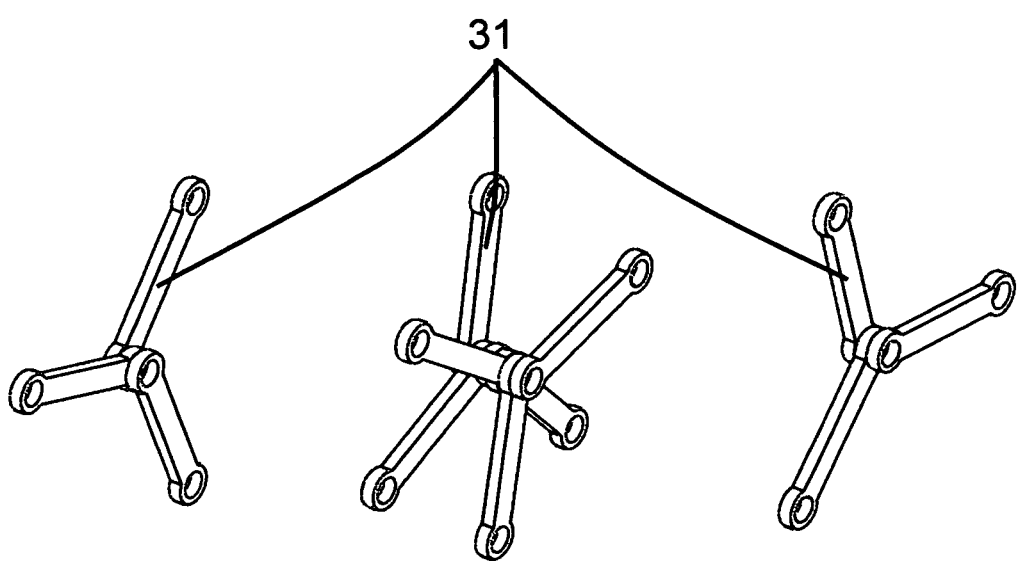
FIG. 24 is an exploded view of components of FIG. 21.
Figure 25:
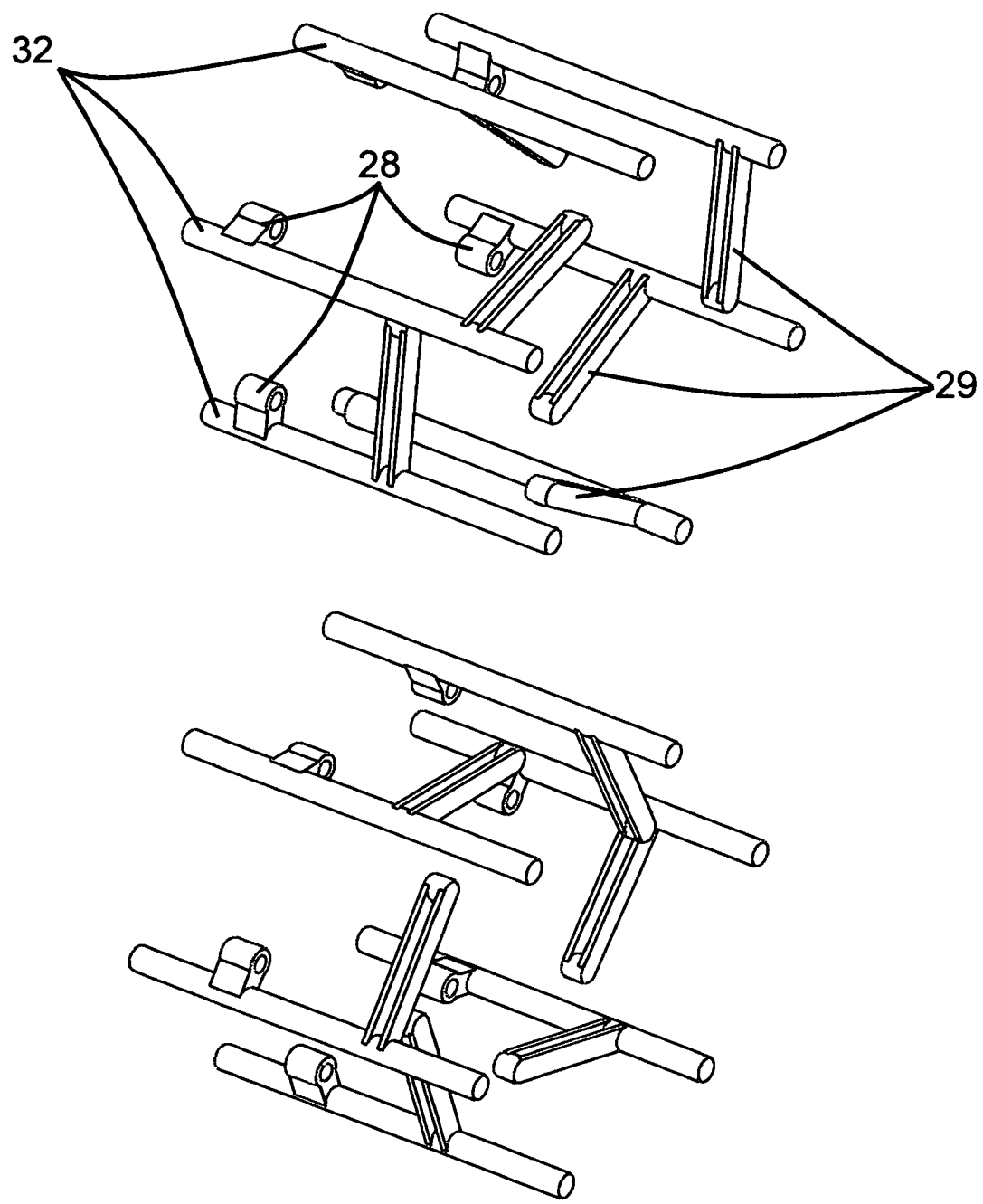
FIG. 25 is an exploded view of components of FIG. 21.
Figure 26:
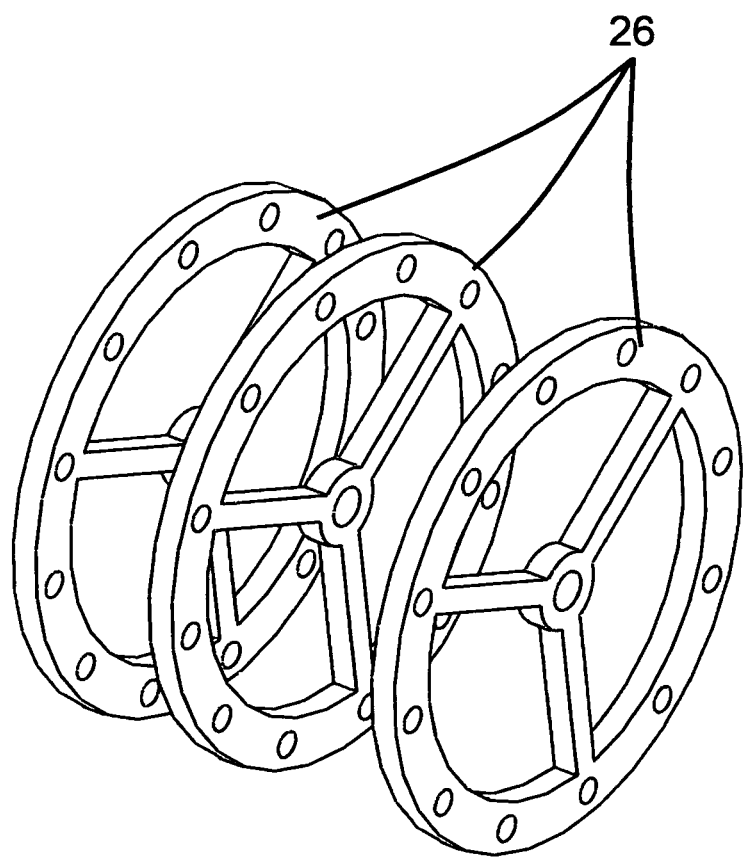
FIG. 26 is an exploded view of components of FIG. 21.

FIGS. 12-20A further illustrate the operation of the gear set. In FIGS. 12 and 12A, the translational gear has point A in the up position. The drawings show a point of reference C located on the spur gear. In FIGS. 12 and 12A, point C is also located in the up position. As the shaft 21 rotates (see FIGS. 13-20A), the spur 23 rotates, as shown by point C moving in a counter-clockwise direction. As the spur gear rotates, as shown by point C moving in a clockwise direction. As the spur gear rotates, it moves the translational gear 22 about a circular path outside of the spur gear 23. The translational gear 22 moves to a rightmost position (see FIG. 12A), then to a bottommost position (see FIG. 14A), then to a leftmost position (see FIG. 16A) and back to a topmost position (FIG. 18A). Point A remains in the up position. Also shown in FIGS. 12-20A, the translational gear 22 rotates the crankshaft 24 in unison. As the crankshafts rotate, shaft 20 also rotates. Thus, with each revolution of the crankshafts, the translational gear 22 competes one revolution about its circular path outside of the spur gear and the spur gear rotates part of a revolution.

In the embodiments shown herein, the frames are shown somewhat schematically, for illustrative purposes.

FIGS. 21 through 26 illustrate another embodiment of the gear set 1. In this embodiment, plural translating components are used. Specifically, plural translating gears 22 are used. The translational gears are mounted on linkages, with crankshaft having multiple crank pins for receiving a respective translational gear. The translational gears are offset from each other so as to balance the centrifugal loads. For example, as shown in FIGS. 21 through 26, the center translational gear is offset 180 degrees apart from the two endmost translational gears. The sum of the masses of the two endmost translational gears is the same as the mass of the center translational gear.

The speed ratio for the gear set 1 is provide in Table 1. Gear set 1 comprises a low torque component, a high torque component, and translating component. The speed ratio is dependent upon the number of teeth of the spur gear 23 ($N_S$) and the translational gear 22 ($N_R$). The input and output rotate in opposite directions.

TABLE 1

Gear Set Constraints and Speed Ratio Equations

| Low Torque | High Torque | Translating Component | Speed Ratio Equation |
| --- | --- | --- | --- |
| Crankshaft | Spur Gear | Ring Gear | $\frac{-N_S}{N_R - N_S}$ to 1 |

Figure 28:
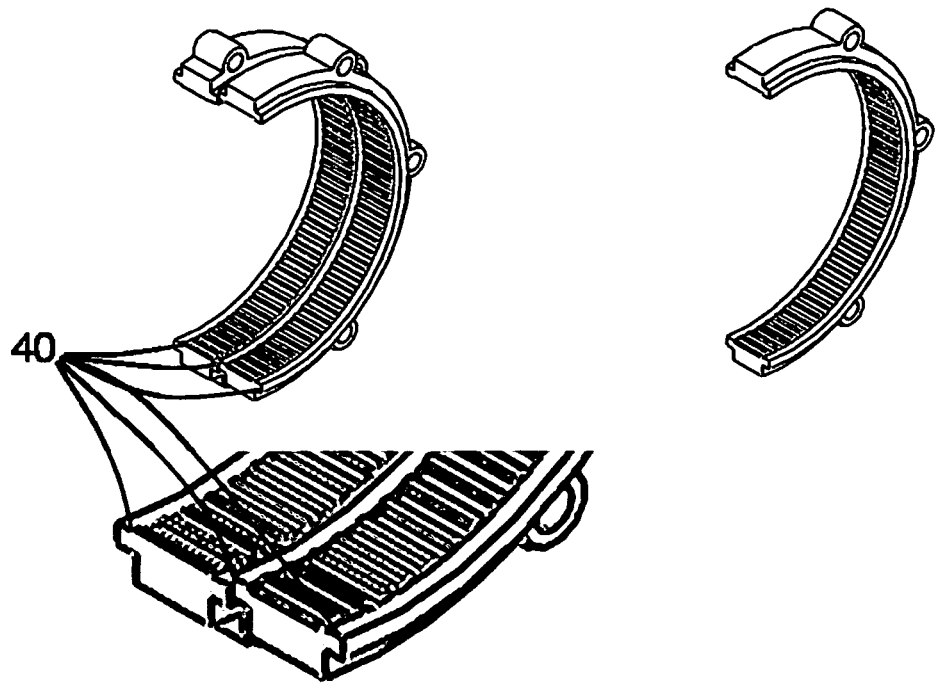
FIG. 28 is a perspective view of translational gear alignment guide.
Figure 29:
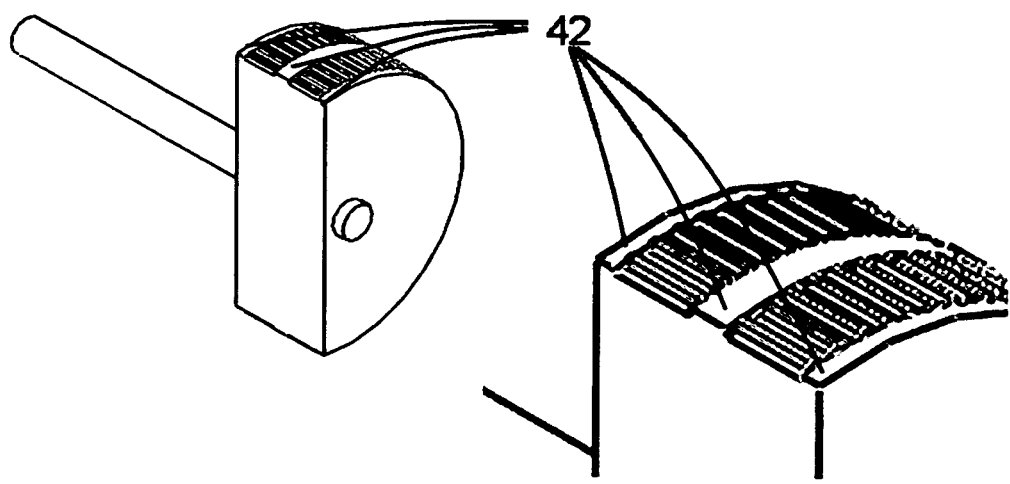
FIG. 29 is a perspective view of spur gear rollers alignment guide.

FIGS. 28 and 29 illustrate an improvement to gear set 1 which is an alignment guide between the spur gear 23 and translational gear 22.

Figure 27:
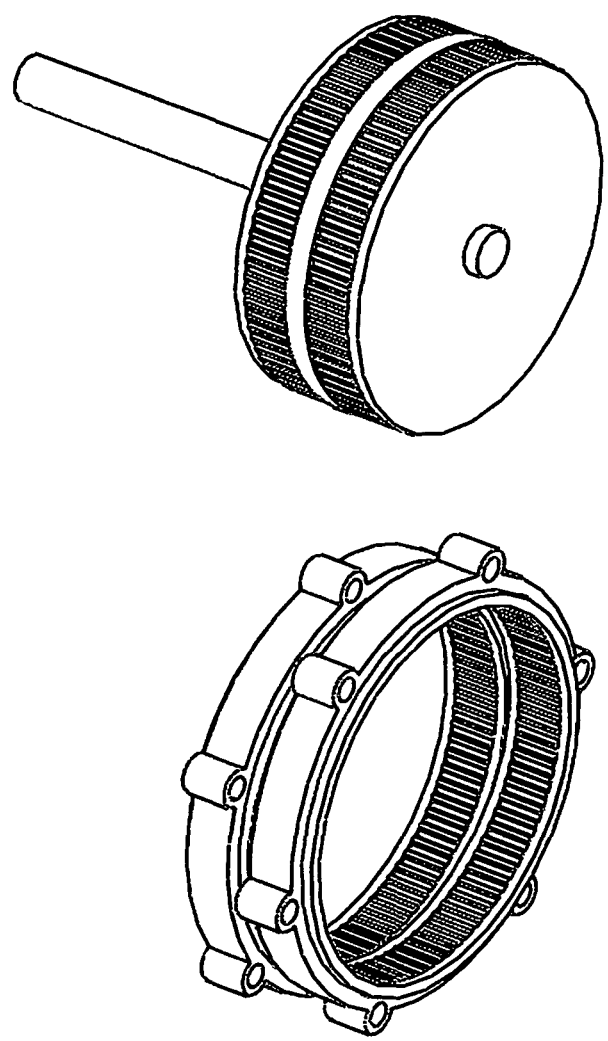
FIG. 27 is a perspective view of spur gear rollers and translational gear outer racer.

The system has a built in self alignment capability. The centrifugal forces of the translating gear with alignment guides 42 on the spur gear and alignment guides 40 translating gear enable the gear alignment (see FIGS. 27, 28 and 29).

The foregoing disclosure and showing made in the drawings are merely illustrative of the principles of this invention and are not to be interpreted in a limiting sense.

The invention claimed is:
1. A gear set, comprising:
 a) an input and an output, with a speed ratio between the input and the output;

b) a first gear that rotates, said first gear provides a circular path for a second gear that is engaged with said first gear, said first gear connected to one of the input or the output;

c) said second gear engaged with said first gear and translating in the path relative to said first gear connected to the other of the input or the output;

d) a frame that is fixed relative to said first gear, said frame being coupled to said second gear by three or more linkages and a crankshaft where said linkages are configured to (1) constrain rotation of said second gear, (2) translate said second gear about rotational path, and (3) transmit torque and power between said second gear and said crankshaft.

2. The gear set of claim 1, wherein the first gear comprises a spur gear and the second gear comprises a ring gear.

3. Two or more of the gear sets of claim 1 are coupled together in parallel.

4. The gear set of claim 1, further comprising guides or rail on a spur gear and translating gear which maintains alignment between the gears.

\* \* \* \* \*